April 25, 1939.　　　　F. G. SMITH　　　　2,156,247
MACHINE FOR CUTTING ICE CAKES INTO CUBES
Filed July 26, 1937　　　2 Sheets-Sheet 1

INVENTOR.
Forest G. Smith.
BY Corbett + Mahoney
ATTORNEYS.

April 25, 1939.　　　　F. G. SMITH　　　　2,156,247
MACHINE FOR CUTTING ICE CAKES INTO CUBES
Filed July 26, 1937　　　2 Sheets-Sheet 2

INVENTOR.
Forest G. Smith.
BY Corbett & Mahoney
ATTORNEYS.

Patented Apr. 25, 1939

2,156,247

UNITED STATES PATENT OFFICE 2,156,247

MACHINE FOR CUTTING ICE CAKES INTO CUBES

Forest G. Smith, Columbus, Ohio, assignor to The Central Ohio Conveyor Company, Columbus, Ohio, a corporation of Ohio Application July 26, 1937, Serial No. 155,675

3 Claims. (Cl. 143—38)

My invention relates to a machine for cutting ice cakes into cubes. It has to do, more particularly, with a novel type of machine for cutting large cakes of ice into a large number of small cubes adapted to be used in beverages, etc.

There have been many different types of machines devised in the past for cutting ice cakes into cubes. Some of these machines have been manually operated, it being necessary to feed the ice to the cutting means by hand. Obviously, the use of such a machine is extremely hazardous to the operator inasmuch as his fingers might be injured by the cutting means. Some of the machines used in the prior art have been automatically operated so as to eliminate the danger of injury to the operator. However, these machines have been of such complicated structure and so difficult to manufacture that their cost has been so high as to render their use prohibitive by hotels, restaurants, etc. Furthermore, such prior art machines, because of their complicated nature, usually embody a large number of parts and units which readily become inoperative due to their complicated and fragile nature. Prior art machines of this general type have also been possessed of many other disadvantages.

One of the objects of my invention is to provide a machine for cutting a cake of ice into a large number of cubes, the machine being extremely efficient and economical in operation and having a high capacity.

Another object of my invention is to provide a machine of the type indicated which is entirely automatic in operation and is of such a nature as to eliminate danger of injury to the operator.

Another object of my invention is to provide a machine of the type indicated which is very simple in structure so that it can be manufactured at a comparatively low cost.

Another object of my invention is to provide a machine of the type indicated which is of very sturdy construction so that there will be no danger of it becoming inoperative even after long continuous operation.

In its preferred form, my invention contemplates the provision of a machine comprising a horizontally disposed table having a plurality of cutting members associated therewith. These cutting members are so arranged that if an ice cake is moved successively into contact therewith, the cake will be divided into a large number of small cubes. The cake of ice to be cut merely rests on the table and means is provided for sliding it along the table so that it will be brought successively into engagement with the various cutting members. Thus, the cake of ice is fed automatically to the various members so as to eliminate any danger of injury to the operator. The means for feeding the cake of ice to the various cutting members is extremely simple and is very efficient.

The preferred embodiment of my invention is illustrated in the accompanying drawings wherein similar characters of reference designate corresponding parts and wherein.

Figure 1:
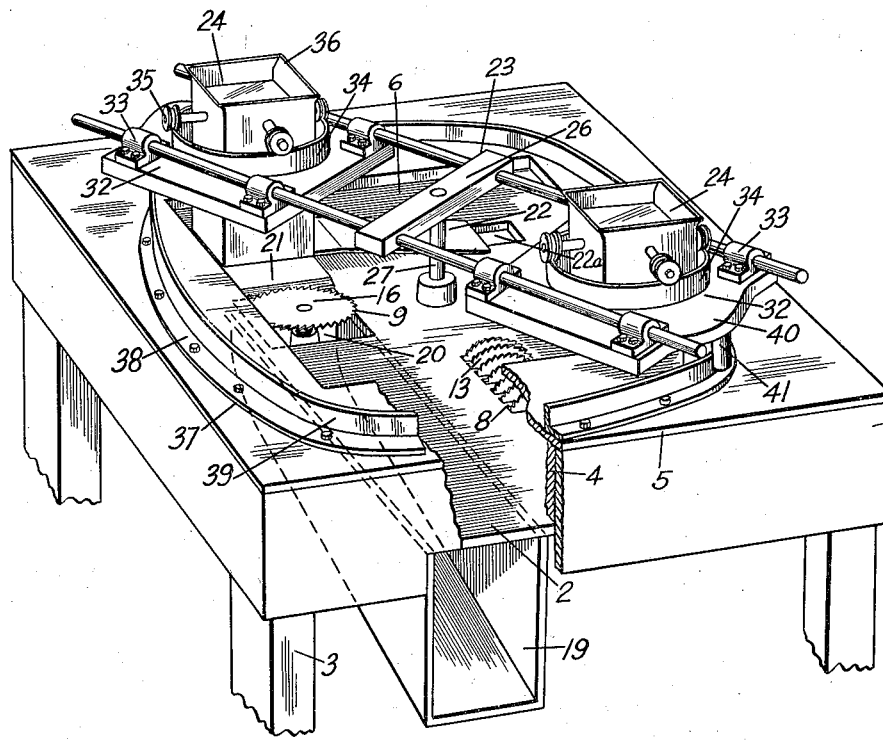
Figure 1 is a perspective view, partly broken away, of a machine made in accordance with the principles of my invention.

With reference to the drawings, I have illustrated my machine as comprising the table 1 embodying a flat horizontally disposed top 2, supported on legs 3. The top 2 is of substantially square form and is provided with an upstanding wall 4 which extends along all of its edges. A plate 5 is mounted on the upper edge of the wall 4. It will be noted that the plate 5 is provided with a large centrally disposed square opening 6.

A plurality of cutting units are associated with the top 2 of the table for cutting a cake of ice adapted to be moved around on top of the table. As illustrated in the drawings, three cutting units designated 7, 8 and 9 are provided. The cutting unit 7 is disposed at one side of the table and embodies a plurality of vertically disposed saw-blades 10 which project upwardly through an opening in the top 2 of the table. These blades 10 are mounted on the shaft 11 of an electric motor 12, which is secured to the under surface of the top 2, so as to rotate with said shaft. The cutting unit 8 is disposed adjacent another side of the table which is contiguous to the side at which the cutting unit 7 is disposed. The cutting unit 8 is exactly the same as the cutting unit 7 embodying vertically disposed rotatable saw-blades 13 which project upwardly through an aperture in the top of the table and which are carried by the drive-shaft 14 of an electric motor 15 which is secured to the under surface of the top 2. The cutting unit 9 is disposed adjacent another side of the table which is contiguous to the side at which the cutting unit 8 is disposed. This cutting unit 9 merely embodies a single horizontally disposed saw-blade 16 which is keyed to the vertically extending shaft 17 of an electric motor 18. The electric motor 18 is attached to the bottom of an inclined discharge chute 19 disposed below the top of the table. The saw-blade 16 is located directly above a discharge aperture 20 formed in the top 2 of the table and which is in communication with the upper end of the discharge chute 19. It will be noted that the blade 16 is spaced slightly above the top surface of the table.

All of the cutting units are disposed on the table in such a manner that they are located below the opening 6. In fact, they are all located adjacent successive edges of this square opening. It will be noted that the blades of the cutting unit 8 are disposed at right angles to those of the cutting unit 7. These two units are adapted to produce vertical cuts in the cake of ice at right angles to each other. They project upwardly from the top of the table to a predetermined extent so that they will cut into the cake of ice to the desired extent. The cutting unit 9 will serve as a cut-off and will produce a horizontal cut in the cake of ice. The cutting units 7 and 8 are so arranged that the cuts which they produce will extend into the cake of ice to a slight extent past the point where the horizontal cut will be produced by the unit 9. It will be apparent that all of the cutting units are operated by an independent electric motor. This greatly simplifies the driving means.

Directly adjacent the cutting unit 9 is disposed a raised horizontal support 21. This support 21 has an inclined plate 22 leading downwardly therefrom towards the opposite side of the table. Adjacent the lower end of the incline 22 is an aperture 22ª formed in the top 2 of the table to permit discharge of waste material from the machine.

Figure 2:
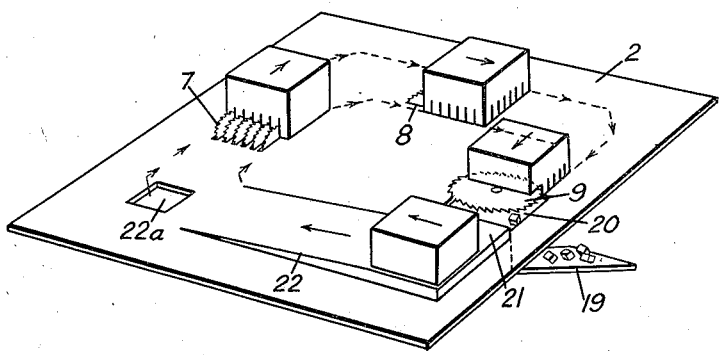
Figure 2 is a diagrammatic view illustrating substantially the path of movement of a cake of ice on the machine during the time it is being cut into cubes.

The cake of ice to be cut into cubes is adapted to rest on the top 2 of the table and to be moved around on the surface of the table substantially through the path illustrated in Figure 2. That is, the cake of ice is first adapted to be moved into contact with the cutting unit 7 with one of its faces perpendicular to the plane of the blades of this cutting unit. The cake of ice is then adapted to be moved at right angles to its first direction of movement into contact with the cutting unit 8 with one of its faces perpendicular to the blades of said cutting unit. Then the cake of ice is again moved at right angles to its second direction of movement until it is brought into contact with the cutting unit 9. The cutting units 7 and 8 produce vertical cuts at right angles to each other and the cutting unit 9 produces a horizontal cut which serves to sever the cubes from the cake of ice.

I will now describe the means for causing the cake of ice to slide around on the top surface of the table in the manner just described. As illustrated in the drawings, this means comprises mainly a carriage 23 which carries a pair of ice cake holders 24. The carriage 23 embodies a pair of rods 25 which are disposed in parallel relationship and which are carried by a cross-arm 26 in which the rods are immovably secured. The cross-arm 26 is keyed to the upper end of a vertically extending shaft 27 which extends upwardly to a point considerably above the plate 5. The shaft 27 extends below the top 2 of the table and is rotatably carried by suitable bearings mounted on the table. This shaft is rotated by means of a sprocket and chain drive 28 which is connected to a speed-reducing unit 29 driven by an electric motor 30 secured to the lower surface of the top 2 of the table. A shear device 31 is interposed in the shaft 2 and is of such a nature that it will operate to interrupt the drive to the carriage in case a predetermined resistance to rotation of the shaft is developed, due to, for example, clogging of certain parts of the machine.

The ice-holders 24 are mounted on the carriage 23 by means of a pair of supporting units 32. Each supporting unit comprises a plate having the four upstanding bearings 33 secured thereto adjacent to corners thereof. The rods 25 extend through bearings and are slidable relative thereto. Thus, the unit 32 is mounted for longitudinal movement relative to the rods 25. Each unit is provided with a large circular aperture having an upstanding annular flange 34 extending around the edge thereof. The ice-holder 24 extends through the said aperture and is provided with a grooved roller 35 on each side thereof which rest on the upper edge of the flange 34. The ice-holders 24 are of rectangular cross-section and are adapted to receive a cake of ice. They are open at both their upper and lower ends. They project upwardly a short distance above the units 32 and extend downwardly through the opening 6 in the plate 5 to a point spaced a short distance above the top 2 of the table. The upper end of each ice-holder is flared slightly as at 36 to facilitate insertion of a cake of ice. It will be apparent that each ice-holder is mounted on the cooperating unit 32 in such a manner that it may rotate thereon. Furthermore, each unit 32 is mounted on the rods 25 in such a manner that it may slide therealong.

The ice-holders 24 are adapted to contact with the edge of the square opening 6 and to be guided by the edge of said opening through substantially the path previously described with reference to Figure 2. In order to keep the ice-holders in contact with the edge of the opening during the greater portion of the travel of the holders, I provide a track 37 disposed in surrounding relationship to said opening. This track is spaced slightly from the edge of the opening, as illustrated best in Figures 1 and 3. The track comprises an angle-bar bolted to the upper surface of the plate 5. The track is continuous and comprises a slightly curved section 38 which is disposed adjacent each side edge of the opening 6. These sections 38 have interposed therebetween short, slightly curved sections 39 disposed adjacent each corner of the opening 6. The curved sections 39 have their center of curvature at the axis of shaft 27 which carries the carriage 23. Each of the units 32 is provided with an outwardly projecting portion 40 on its outer end which carries a pair of slightly spaced depending rollers 41. One of the rollers of the pair is adapted to be disposed on each side of the track 37 and to cooperate therewith.

Figure 3:
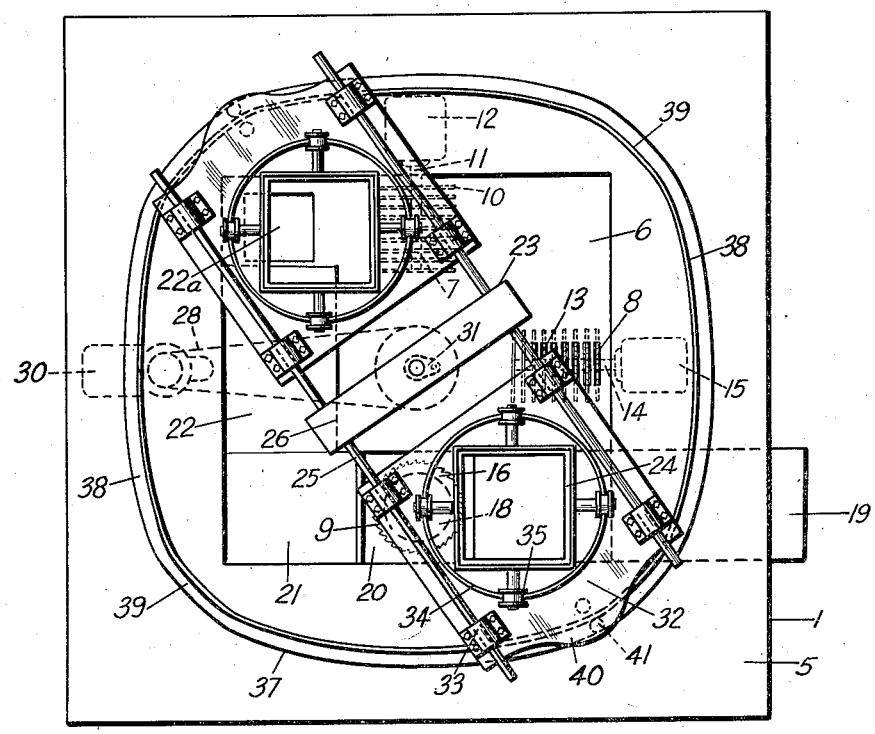
Figure 3 is a plan view of the machine illustrated in Figure 1.
Figure 4:
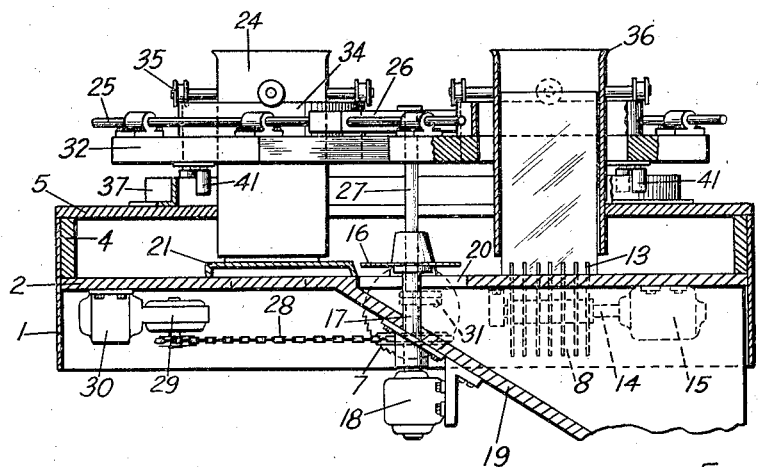
Figure 4 is a section taken vertically through the machine.

The operation of this mechanism will be understood from Figures 2 and 3 of the drawings. When the shaft 27 is rotated, it rotates the carriage 23. The track 37 is so shaped and arranged that it will cooperate with the rollers 41 of each unit 32 to maintain the flat sides of the ice-holders 24 in contact with the edge of the square opening 6 throughout the greater portion of the path of movement of the holders and particularly during the time the cake of ice is being cut by the cutting unit. As the carriage 23 moves the ice-holders 24 around the table, the units 32 will move in and out on the rods 25 and the ice-holders 24 will rotate relative to the units 32 which carry them. This will permit each ice-holder to be moved in a straight line across the table in one direction and when it reaches the opposite side of the table, to move in a direction at right angles to the first movement. However, as indicated in Figure 2, when an ice-holder reaches a corner of the opening 6, it cuts across said corner.

As each ice-holder approaches the corner of the opening 6, the rollers 41 will engage the section 39 of the track disposed at said corner. This section has its center of curvature at the axis of the carriage and will cause the ice-holder to cut across the corner. The rollers 41 will then come into engagement with the section 38 of the track. This section of the track is of such a curvature that as the carriage swings the unit 32 about the axis of the carriage, the rollers 41 will cooperate with the section 38 to move the unit 32 inwardly to a slight extent so that there will not be too much friction develop by contact of the ice-holder with the edge of the opening while it is adjacent the corner. At the time the ice-holder reaches the cutting unit disposed at that side of the opening, the unit 32 will be moved outwardly by the track and cooperating rollers 41 to a slight extent so that the flat side of the ice-holder will be in firm contact with the edge of the opening during the cutting operation. These movements will be repeated as the carriage continues to rotate.

It will thus be apparent that cakes of ice may be inserted in the ice-holders 24. The cakes of ice will merely rest on the top surface of the table. If the carriage is then rotated, the cakes of ice will first be brought into contact with the cutting unit 7 to produce a vertical cut, then they will be brought into contact with the unit 8 to produce a vertical cut at right angles to the first cut and will then be brought into contact with the horizontal cutting unit 9 which will completely sever the cubes from the main portion of the cake. These cubes will drop downwardly through the aperture 20 into the discharge chute 19. As the blade 16 of the unit 9 operates to cut off the cubes, before it passes completely through the cake of ice, the cake will be partly supported by the support 21. The cake of ice merely rests on the top surface of the table and the cubes are cut from the lower surface thereof. After one layer of the cubes is cut from the cake, it will slide onto the support 21 and then slide down the incline 22 so that it will again be supported by the top 2 of the table and another layer of cubes can be cut therefrom. These operations will be repeated until the entire cake is completely cut into cubes.

It will be apparent from the above description that I have provided a machine for cutting cakes of ice into a large number of cubes, the machine being extremely efficient and economical in operation and having a high capacity. The machine is entirely automatic in operation and is of such a nature as to eliminate danger of injury to the operator. The machine is of very simple structure and can be manufactured at a comparatively low cost. It is of a very sturdy construction so that there is no danger of it becoming inoperative even if it is subjected to hard usage.

Various other objects and advantages will be apparent from the preceding description, the drawings and the following claims.

Having thus described my invention, what I claim is:

1. A machine for cutting ice-cubes from a cake of ice comprising a table upon which the cake of ice is adapted to rest, means for moving the cake of ice around said table in a substantially rectangular path, a plurality of cutting units associated with said table and disposed along said path for successively engaging said cake of ice as it is moved along said path, said means for moving the cake of ice along said path comprising a holder for the cake of substantially rectangular cross-section adapted to permit the cake to rest on said table, a rotatable carriage mounted on said table, said carriage including a plurality of rods, a supporting unit mounted on said rods for movement radially relative to the axis of rotation of said carriage, said holder being mounted on said supporting unit in such a manner that it is rotatable thereon, a stationary rectangular guide mounted on said table and with which the holder is adapted to cooperate, and means for maintaining said holder in cooperative relationship with said guide, said means comprising a track associated with said rectangular guide, said track comprising slightly curved portions disposed adjacent each side of said rectangular guide and short sections of different curvature for joining said first sections of track and disposed adjacent each corner of said guide, and rollers carried by said supporting unit adapted to cooperate with said track.

2. A machine for cutting ice cubes from a cake of ice comprising a table upon which the cake of ice is adapted to rest, means for moving the cake of ice around said table in a substantially rectangular path, a plurality of cutting units associated with said table and disposed along said path for successively engaging said cake of ice as it is moved along said path, said means for moving the cake of ice along said path comprising a holder for the cake adapted to permit the cake to rest on said table, a rotatable carriage mounted on said table, a supporting unit mounted on said carriage for movement radially relative to the axis of rotation of said carriage, said holder being mounted on said supporting unit in such a manner that it is rotatable thereon, a stationary rectangular guide mounted on said table and with which the holder is adapted to cooperate, and means for maintaining said holder in cooperative relationship with said guide, said means comprising a track associated with said rectangular guide, said track comprising slightly curved portions disposed adjacent each side of said rectangular guide and short sections of different curvature for joining said first sections of track and disposed adjacent each corner of said guide, and track-engaging means carried by said supporting unit adapted to cooperate with said track.

3. A machine for cutting ice cubes from a cake of ice comprising a table upon which the cake of ice is adapted to rest, means for moving the cake of ice around said table in a substantially rectangular path, a plurality of cutting units associated with said table and disposed along said path for successively engaging said cake of ice as it is moved along said path, said means for moving the cake of ice along said path comprising a holder for the cake adapted to permit the cake to rest on said table, a rotatable carriage mounted on said table, said holder being mounted on said carriage in such a manner that it is movable radially thereof and is also free to rotate about its own axis, a stationary rectangular guide associated with said table and with which the holder is adapted to cooperate, and means for maintaining said holder in cooperative relationship with said guide, said means comprising a track associated with said rectangular guide, said track comprising slightly curved portions disposed adjacent each side of said rectangular guide and short sections of different curvature for joining said first sections of track and disposed adjacent each corner of said guide, and track-engaging means associated with said holder and adapted to cooperate with said track so that the holder will be moved radially of the carriage by the track during rotation of the carriage.

FOREST G. SMITH.